(12) United States Patent
Romanoff

(10) Patent No.: US 6,354,750 B1
(45) Date of Patent: Mar. 12, 2002

(54) FOURTH AXIS CAMERA SUPPORT SYSTEM AND METHOD

(75) Inventor: Andrew B. Romanoff, Los Angeles, CA (US)

(73) Assignee: Panavision, Inc., Woodland Hills, CA (US)

( * ) Notice: Subject to any disclaimer, the term of this patent is extended or adjusted under 35 U.S.C. 154(b) by 0 days.

(21) Appl. No.: 09/322,805

(22) Filed: May 27, 1999

Related U.S. Application Data

(60) Provisional application No. 60/087,133, filed on May 29, 1998.

(51) Int. Cl.[7] .................................................. G03B 17/00
(52) U.S. Cl. ...................... 396/428; 352/243; 248/183.2
(58) Field of Search ............................. 396/419, 427, 396/428; 352/243; 348/373; 248/179.1, 183.1, 184.1, 183.2, 183.4, 278.1

(56) References Cited

U.S. PATENT DOCUMENTS

| | | | | |
|---|---|---|---|---|
| 1,480,651 A | * | 1/1924 | Bailey | 396/428 |
| 2,073,998 A | | 3/1937 | Raby | 248/124 |
| 2,084,643 A | | 6/1937 | Johnson | 240/1.3 |
| 2,156,862 A | | 5/1939 | Maugard | 248/123 |
| 2,224,901 A | | 12/1940 | Cunningham | 248/123 |
| 2,318,633 A | * | 5/1943 | Ries | 396/428 |
| 2,326,657 A | * | 8/1943 | Johnston | 396/428 |
| 3,352,521 A | | 11/1967 | Tyler | 248/123 |
| 3,603,545 A | * | 9/1971 | Boniface | 396/428 |
| 3,613,546 A | | 10/1971 | Richardson | 95/86 |
| 3,638,502 A | | 2/1972 | Leavitt et al. | 74/5.34 |
| 3,788,585 A | | 1/1974 | Masseron | 248/178 |
| 4,040,587 A | | 8/1977 | Gottschalk et al. | 248/185 |
| 4,341,452 A | * | 7/1982 | Korling | 396/428 |
| 4,736,217 A | * | 4/1988 | McDowell | 396/428 |
| 4,838,117 A | | 6/1989 | Bittner | 74/665 |
| 4,907,768 A | | 3/1990 | Masseron et al. | 248/123.1 |
| 4,943,019 A | | 7/1990 | Mester | 248/123.1 |
| 5,054,725 A | | 10/1991 | Bucefari et al. | 248/123.1 |
| 5,056,745 A | | 10/1991 | Gelbard | 248/183 |
| 5,124,938 A | | 6/1992 | Algrain | 364/566 |
| 5,184,521 A | | 2/1993 | Tyler | 74/5.34 |
| 5,289,090 A | | 2/1994 | Miller et al. | 318/282 |
| 5,644,377 A | | 7/1997 | Romanoff et al. | 352/243 |
| 5,835,193 A | | 11/1998 | Romanoff et al. | 352/243 |
| 5,850,579 A | * | 12/1998 | Melby et al. | 396/428 |
| 5,853,153 A | * | 12/1998 | Condrey | 396/428 |

* cited by examiner

Primary Examiner—Alan A. Mathews
(74) Attorney, Agent, or Firm—Lyon & Lyon LLP

(57) ABSTRACT

A camera positioning mechanism including a secondary pan mechanism for rotating the camera about a secondary pan axis, the secondary pan mechanism is mounted on the tilt mechanism and the camera is mounted on the secondary pan mechanism.

18 Claims, 8 Drawing Sheets

US 6,354,750 B1

FOURTH AXIS CAMERA SUPPORT SYSTEM AND METHOD

RELATED APPLICATION DATA

This application claims priority to provisional application Ser. No. 60/087,133 filed May 29, 1998.

BACKGROUND OF THE INVENTION

The field of the present invention relates devices for positioning cameras, particularly motion picture cameras such as film, videotape or digital cameras. For the purposes of this application motion picture cameras shall refer to any type of moving image recording device including conventional cinema cameras, videotape cameras, digital cameras, CCD cameras, or the like. There have been many devices for supporting and positioning cameras including cranes, tripods, dollies and the like. Combined with any of these camera supports is the tilt head to which the camera is mounted which typically provides for tilting and panning of the camera so as to aim the camera for a given shot. These pan and tilt heads may either be directly controlled manually by hand, e.g. friction heads or geared heads, or remotely via electronic or pneumatic/hydraulic control known as remote heads. In any case, the tilt head typically provides for tilt and panning of the camera.

FIGS. 1 and 2 illustrate a conventional remote head 10 supported by a crane 7. The remote head 10 includes a main support arm 12 and an L-shaped mounting plate 14 on which the camera 5 is mounted. A first motor 16 positioned between the crane 7 and the main support arm 12 provides for panning motion and a second motor 18 mounted between the main support arm 12 and the mounting plate 14 provides for tilting motion. The mounting plate 14 may be rotated so as to point the camera 5 directly vertically downward as shown in FIG. 2 for providing an overhead shot.

In motion picture camera systems, the most well-known geared head is the Panahead® described in U.S. Pat. No. 4,040,587. A conventional geared head 30 is illustrated in FIG. 3. The device is known as a geared head because the pan and tilt control are operated by rotating hand wheels 40, 42 which drive the pan and tilt mechanisms via drive gears. The geared head 30 includes a base 32 to which a panning mechanism 34 is mounted. The panning mechanism 34 rotates or pans the camera 5 about a vertical axis in a horizontal plane. The tilt mechanism 36/38 mounted on the panning mechanism 34 tilts the camera 5 up and down. The range of motion of the tilt mechanism 36 is limited by the arc of the tilt cradle 38, but may be extended by a separate tilt plate 39 (shown having a female dovetail) mounted on the top of the tilt mechanism 36 permitting the camera 5 which has male dovetail plate 39a attached on the bottom thereof, to be aimed directly upward or downward (i.e. vertical upward as shown in FIG. 3) depending upon which direction the camera is mounted onto the mounting plate 39.

Some heads include a third rotational axis providing for roll of the camera, that is, rotation about an axis positioned generally about the line of sight of the camera lens.

In each of these heads, the positioning mechanisms are interconnected. The tilt mechanism is mounted on the pan mechanism (Pan/Tilt) as in FIGS. 1–3. If a third axis is provided, a roll mechanism may be mounted (a) on the tilt mechanism producing a Pan/Tilt/Roll configuration or (b) on the pan mechanism, the tilt mechanism then being mounted on the roll mechanism producing a Pan/Roll/Tilt configuration.

The present inventor has determined that even providing rotational control about three axes (e.g. Pan/Tilt/Roll), the camera is still limited in the range of motions which it can accomplish.

SUMMARY OF THE INVENTION

The present invention is directed to a camera positioning mechanism and positioning method whereby the positioning mechanism is provided with a secondary pan mechanism for rotating the camera about a secondary pan axis, the secondary pan mechanism preferable mounted on the tilt mechanism, the camera then being mounted on the secondary pan mechanism. The secondary pan mechanism may be added to: a PAN/TILT device mounted on the tilt plate; a PAN/TILT/ROLL device mounted on the roll plate; a PAN/ROLL/TILT device mounted on the tilt plate.

DETAILED DESCRIPTION OF THE PREFERRED EMBODIMENTS

Figure 1:
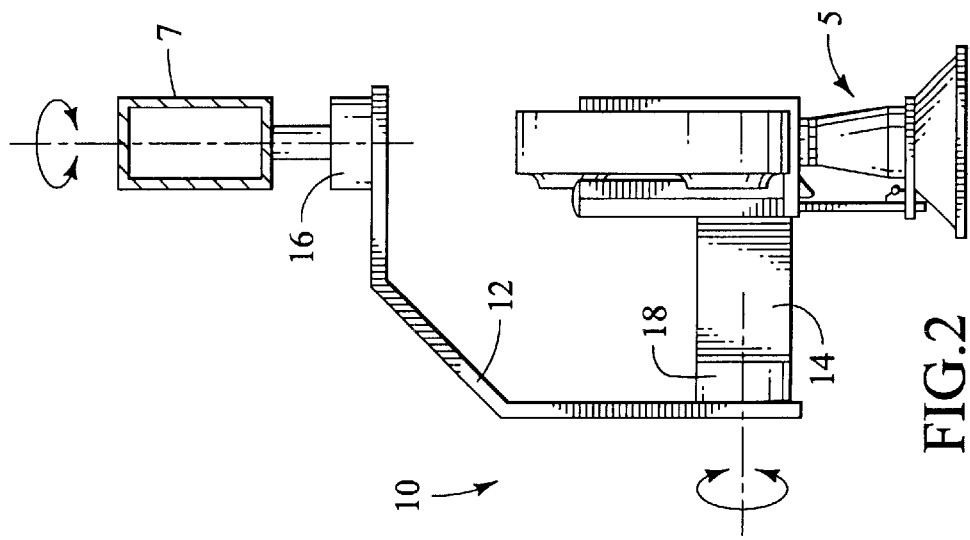
FIG. 1 is front elevation view of a camera mounted on a conventional remote head attached on a crane arm.
Figure 2:
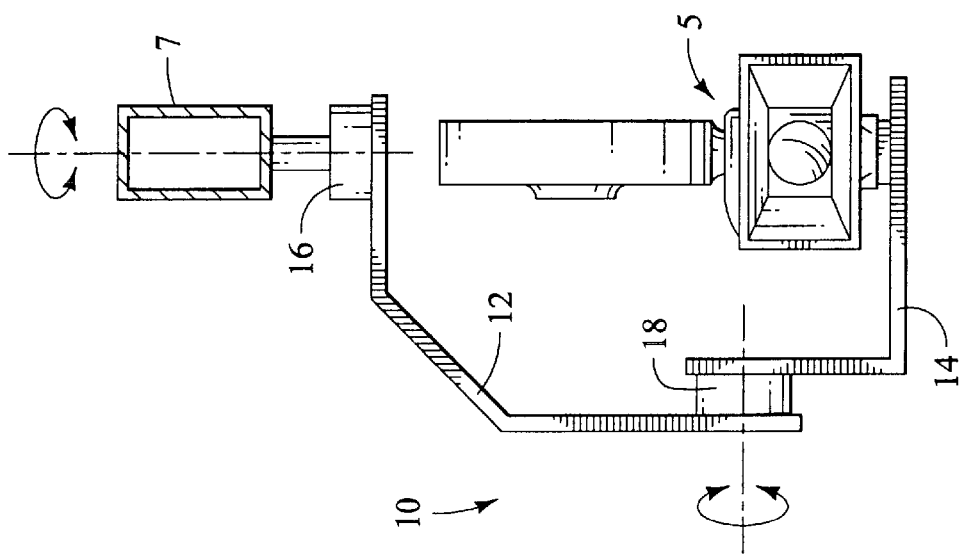
FIG. 2 is a front elevation view of the remote head of FIG. 1 with the tilt mechanism of the head rotated to point the camera vertically downward.

The preferred embodiments will now be described with reference to the drawings. To facilitate description, any reference numeral designating an element in one figure will designate the same element if used in any other figure.

Figure 4:
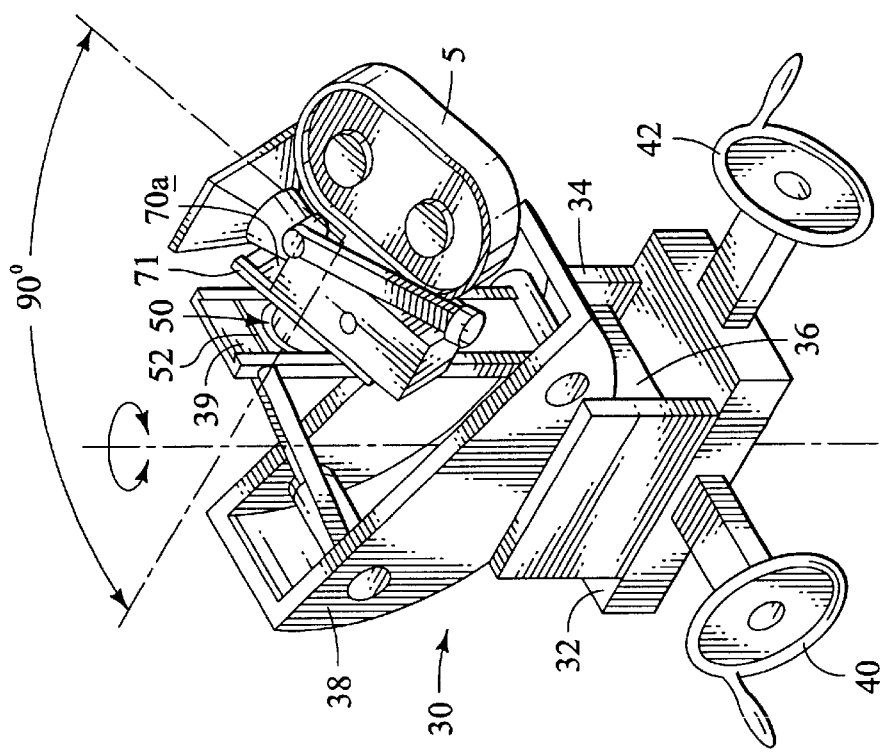
FIG. 4 is a rear left perspective view of a camera mounted to a pan, tilt, and secondary pan mechanism according to a preferred embodiment of the present invention.
Figure 3:
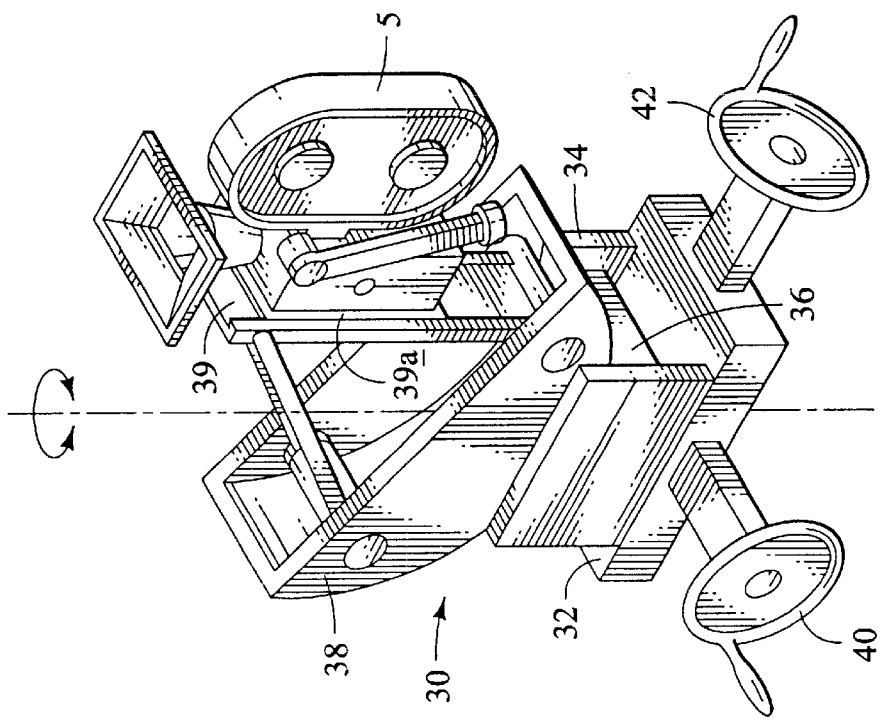
FIG. 3 is a rear left perspective view of a camera mounted on a conventional tilt plate geared head positioning the camera to point vertically upward.

FIG. 4 illustrates a first preferred embodiment of a camera mounted to a pan, tilt, and secondary pan mechanism 50 modifying what is otherwise a conventional geared head 30. The tilt and primary pan controls are operated by rotating hand wheels 40, 42 driving the pan and tilt mechanisms via drive gears. The geared head 30 includes a base 32 to which the primary pan mechanism 34 is mounted. The pan mechanism 34 rotates or pans the camera 5 about a vertical rotational axis through a horizontal plane. The tilt mechanism 36 is mounted on the panning mechanism 34 and tilts the camera 5 up and down. The range of motion of the tilt mechanism 36, limited by the arc of the of the tilt cradle 38, is extended by a separate tilt plate 39 (shown having a female dovetail) mounted on the top of the tilt mechanism 36 permitting the camera 5 to be aimed directly upward or downward (i.e. vertical upward as shown in FIG. 4). The secondary pan mechanism 50, which may be also referred to as a fourth axis, is mounted to the tilt plate 39, the bottom portion 52 dovetailing into the plate 39. When operated, the secondary pan mechanism 50 pans the camera 5, rotating it in a plane parallel to the tilt plate 39.

FIGS. 5–10 illustrate a preferred configuration for the secondary pan mechanism 50 employing a motor 60. The secondary pan mechanism 50 includes a mounting plate or base 52 which is mounted to the tilt plate 39 as shown in FIG. 4. A ring bearing assembly 54 is attached to the base plate 52 with a female dovetail mounting bracket 71 mounted on the other end. The ring bearing assembly includes angular contact bearings 55 held in place between upper plate 56 (below lip 56a) and lower plate 52 via clamp 59 and clamp plate 57. The clamp 59 holds the outer race of the bearing 55 and the clamp plate 57 holds the inner race of the bearing 55 in place. A worm gear 58 is mounted to the underside of the clamp plate 57. The worm gear 58 is driven by a worm 64 mounted on shaft 62. The shaft 62 is axially supported by bearings 65, 66 and is driven by the motor 60. The bearings 65, 66 are mounted in respective bearing blocks 65a, 66a. Thrust bearings 67a and 67b are also mounted to the shaft 62. Thus by operation of the motor 60 driving the shaft 62 via coupling 61, the top plate 56 is rotated via the worm 64 and worm gear 58 combination.

The camera 5 is mounted to the dovetail mounting plate 71 via a camera mount 70 (which includes a male dovetail 70a) attached on the bottom of the camera 5. The mounting plate 71 itself is mounted to the top plate 56. The motor 60 is operated via a suitable actuator or controller 68 which may include manual actuator, such as a switch or joystick control, separately and independently operating the motor 60. Alternately, the secondary pan mechanism may be automatically implemented. As the camera approaches straight vertical tilt position, the controller 68 may sense the tilt position and transfer from driving the primary pan mechanism (as it changes from a linear motion to a rolling motion) to driving the secondary pan mechanism 50, the secondary pan mechanism then being operated via the same actuator for the primary pan mechanism. In a preferred embodiment, the transition from primary to secondary pan is gradual such that both primary and secondary pan mechanisms are driven, the primary pan decreasing to zero as the camera reaches straight vertical.

The arc over which the second pan mechanism rotates may be limited to 90° (±45°) to avoid imbalance of the heavy camera 5. The motor may include an internal brake to prevent undesired rotation of the secondary pan mechanism 50. The system may further include a suitable means for sensing the position of the secondary pan mechanism 50 such as a sensor or optical encoder 69 mounted to the shaft 62 and providing a suitable signal to the controller 68.

The secondary pan mechanism 50 is mounted to the tilt plate to form a Pan/Tilt/Pan combination, thereby forming a three axis control system. Alternately, the system may include a Roll axis control (e.g. Pan/Tilt/Roll or Pan/Roll/Tilt), the secondary pan mechanism would be added to produce a four axis control in either (a) a Pan/Tilt/Roll/Pan combination in which case the secondary pan mechanism would be mounted to the roll mechanism or (b) a Pan/Roll/Tilt/Pan combination in which case the secondary pan mechanism would be mounted to the tilt mechanism.

Alternately, a roll axis may be added to the PAN/TILT/PAN mechanism, the roll mechanism mounted to the secondary pan to produce a four axis control PAN/TILT/PAN/ROLL system to provide alternate camera position control.

Figure 5:
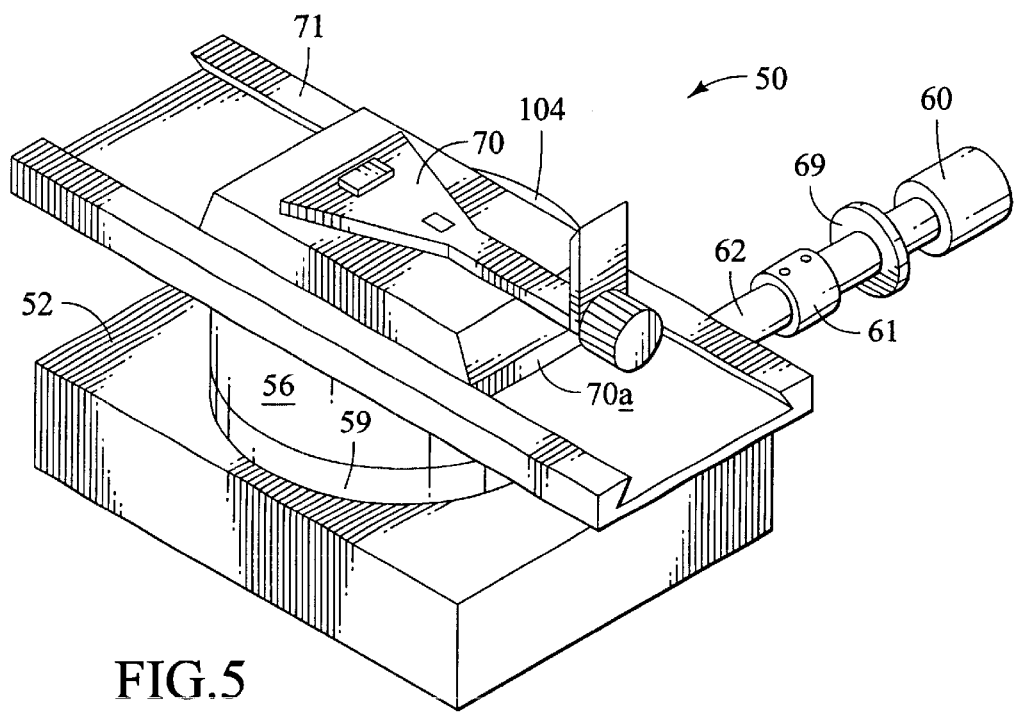
FIG. 5 is a detailed perspective view of a secondary pan mechanism employing a motor drive configuration.
Figure 6:
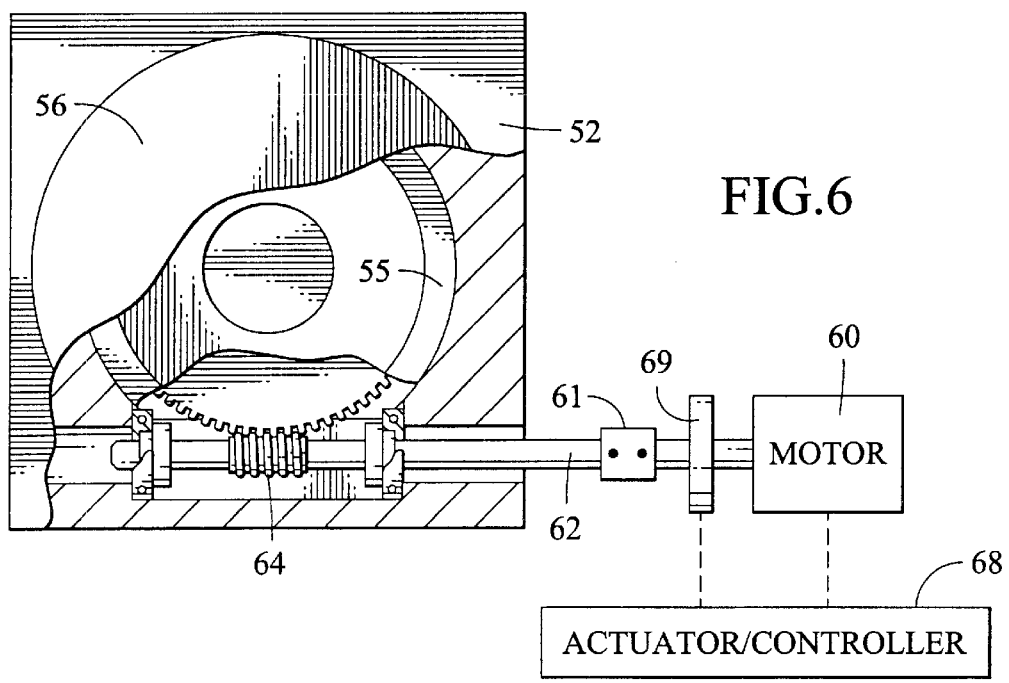
FIG. 6 is a partially diagrammatic top plan view of a gear drive mechanism for a secondary pan mechanism of FIG. 5.
Figure 7:
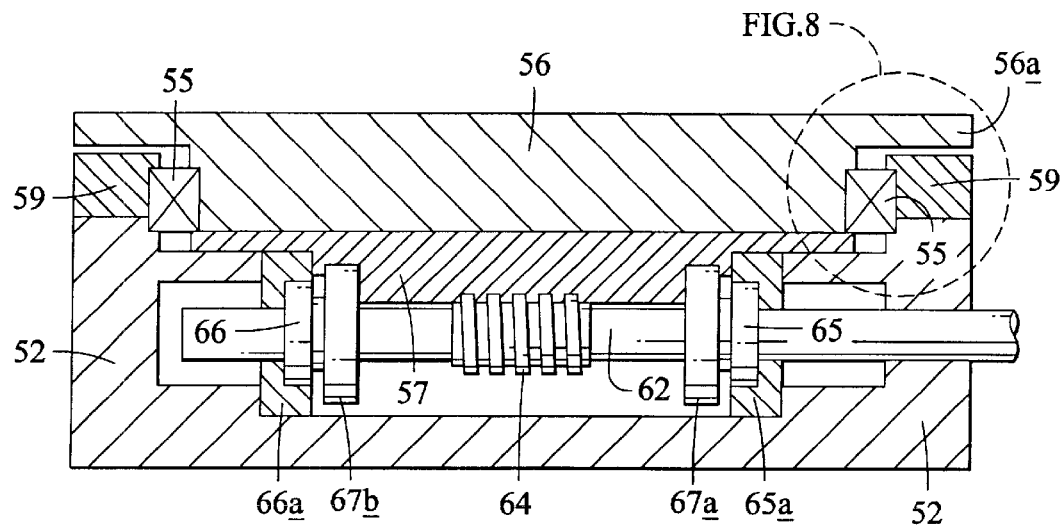
FIG. 7 is a partially diagrammatic cross section side view of the gear drive mechanism of FIG. 6.
Figure 8:
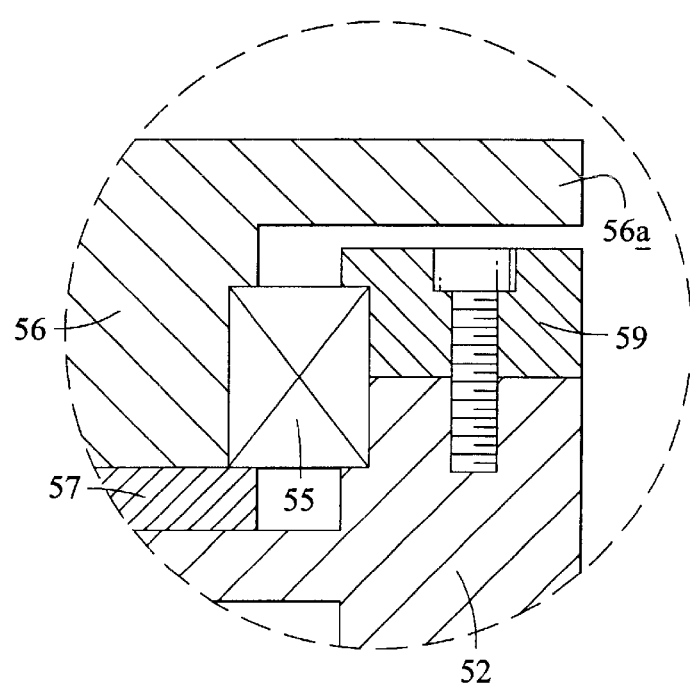
FIG. 8 is an enlarged view of a portion of FIG. 7.
Figure 9:
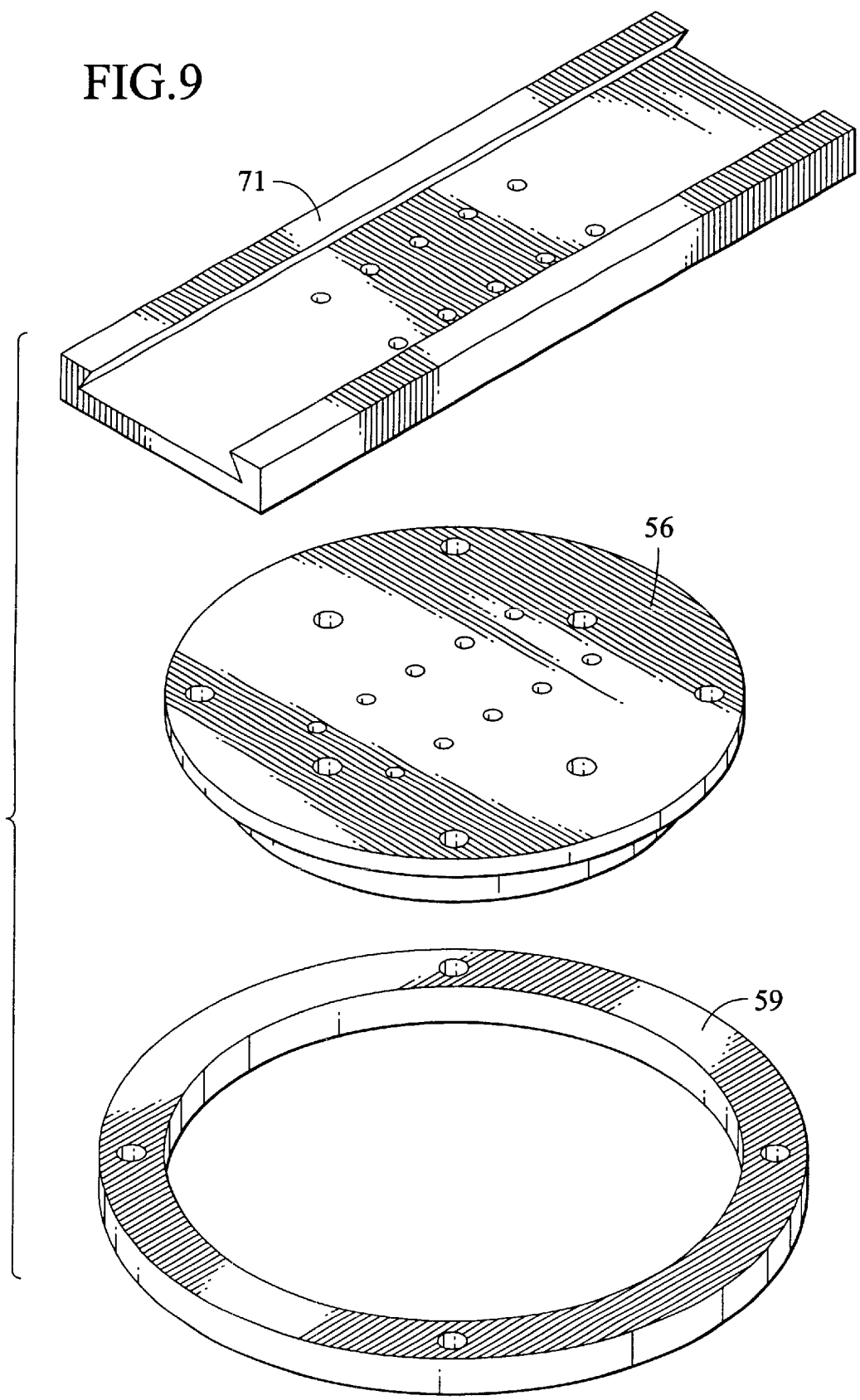
FIGS. 9 and 10 in combination are exploded view of the secondary pan mechanism of FIG. 5.
Figure 10:
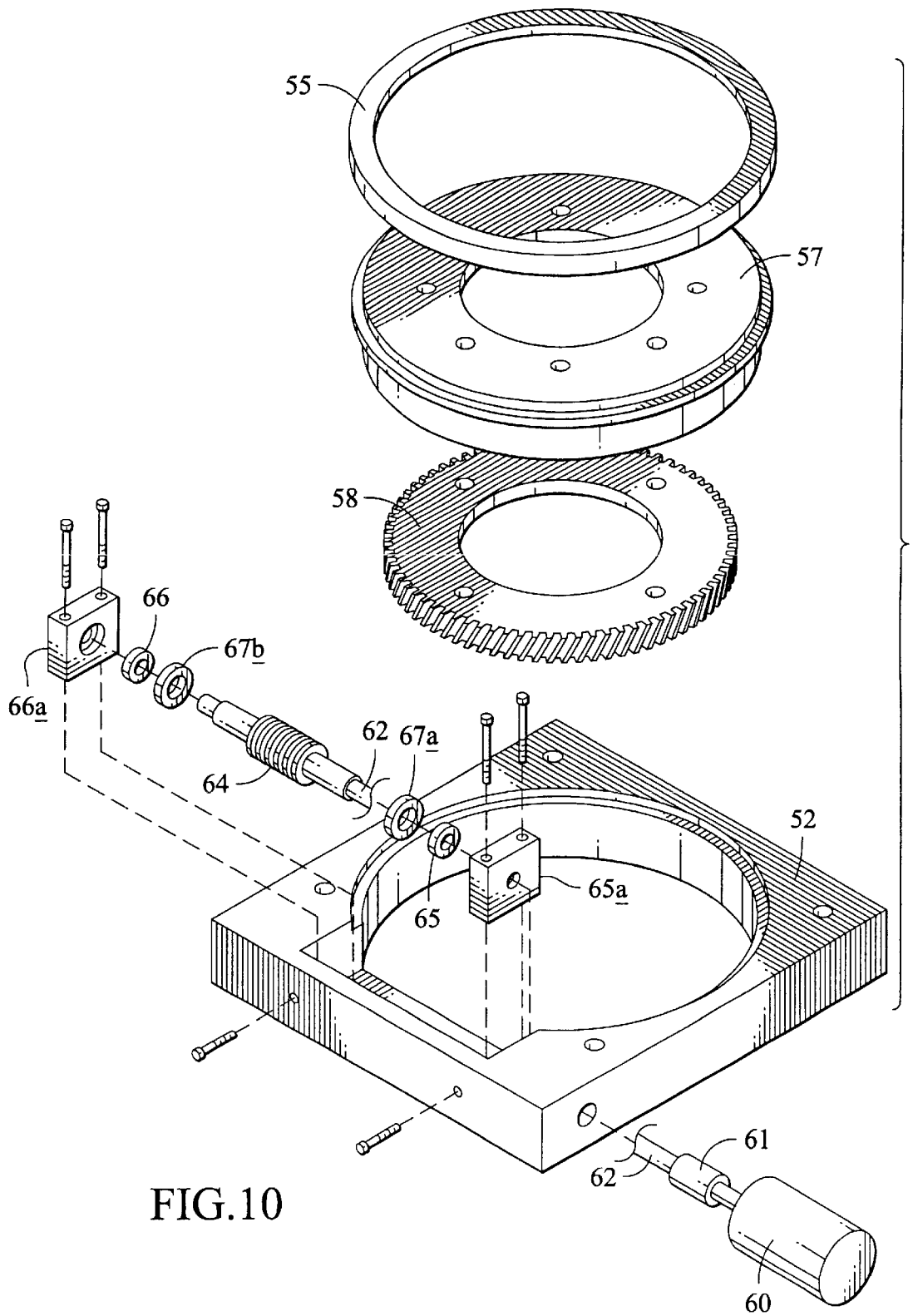
Figure 12:
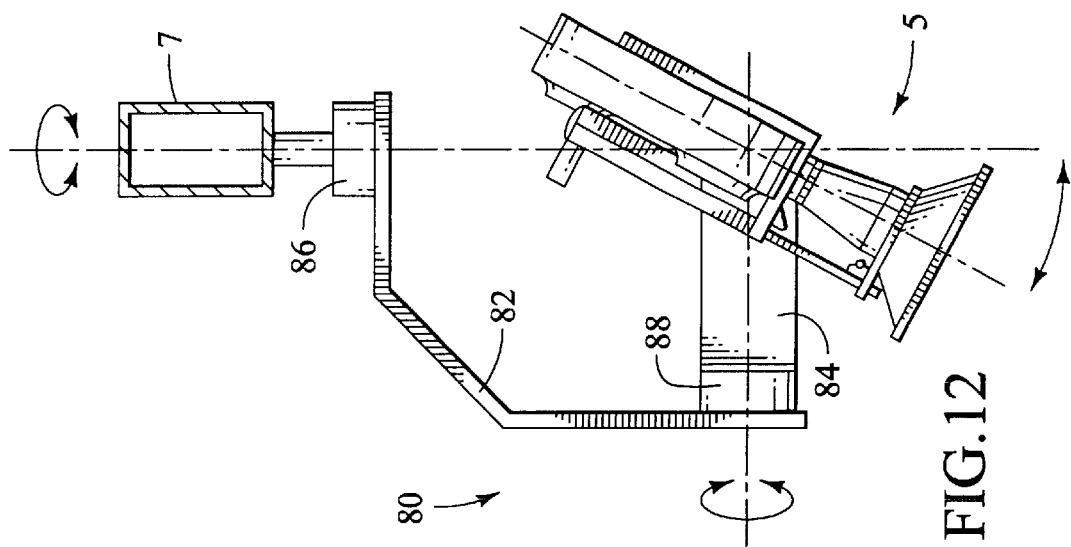
FIG. 12 is a front elevation view of the system of FIG. 8 with the camera tilted to point downward and then rotated by the secondary pan mechanism.
Figure 11:
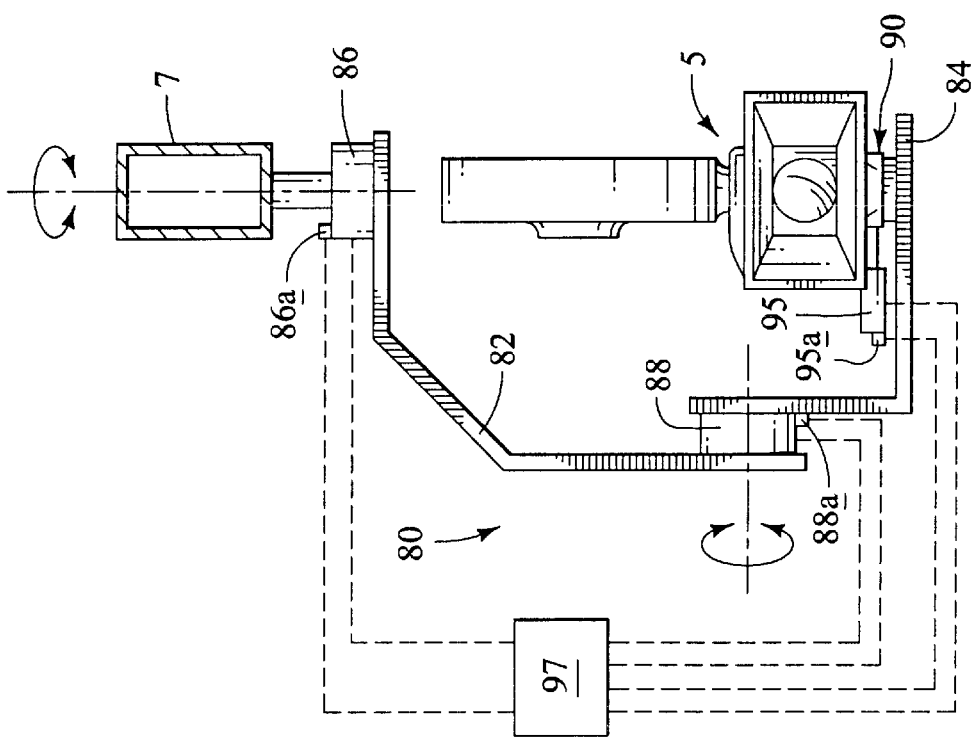
FIG. 11 is a front elevation view of a camera mounted on a remote head including a secondary pan mechanism.

FIGS. 11 and 12 illustrate a remote head 80 supported by a crane 7 having a camera 5 mounted on a secondary pan mechanism 90 of similar configuration to the secondary pan mechanism 50 of FIGS. 5–7 . The remote head 80 includes a main support arm 82 and an L-shaped mounting plate 84 on which the secondary pan mechanism 90 and drive motor 95 are mounted. A first primary pan motor 86 positioned between the crane 7 and the main support arm 82 provides primary panning motion and a second motor 88 mounted between the main support arm 82 and the mounting plate 84 provides tilting motion. The mounting plate 84 may be rotated so as to point the camera 5 directly vertically downward at which point (or at some other position if desired) the secondary pan motor 95 may be operated to provide panning in an overhead shot as shown in FIG. 12.

There may be physical constraints or balancing constrains which may limit the range for the secondary panning operation. Such limitations may be incorporated into the controller automatically limiting the operating range for example to prevent the camera 5 from striking the support arm 82.

The secondary pan mechanism, whether operated remotely via motors or manually, may be actuated and controlled by any suitable mechanism such as a joystick, handwheel or force bar (e.g. hand operated or foot operated). In some instances, it may be desirable to have a second operator operate the secondary pan. In other instances, it may be desirable to include some control features so that a single camera operator may operate all the controls (pan, tilt and secondary pan). One such control feature is diagrammatically illustrated in FIG. 11, whereby the system is provided with suitable sensors 86a, 88a and 95a associated with respective motors 86, 88 and 95 for sensing positions of the primary pan, tilt and secondary pan mechanisms. The sensors 86a, 88a and 95a communicate with a controller 97 which in turn controls operation of the motors 86, 88 and 95 based for example on the pan and tilt inputs from the operator and the relative positions of the tilt and pan mechanisms.

Figure 13:
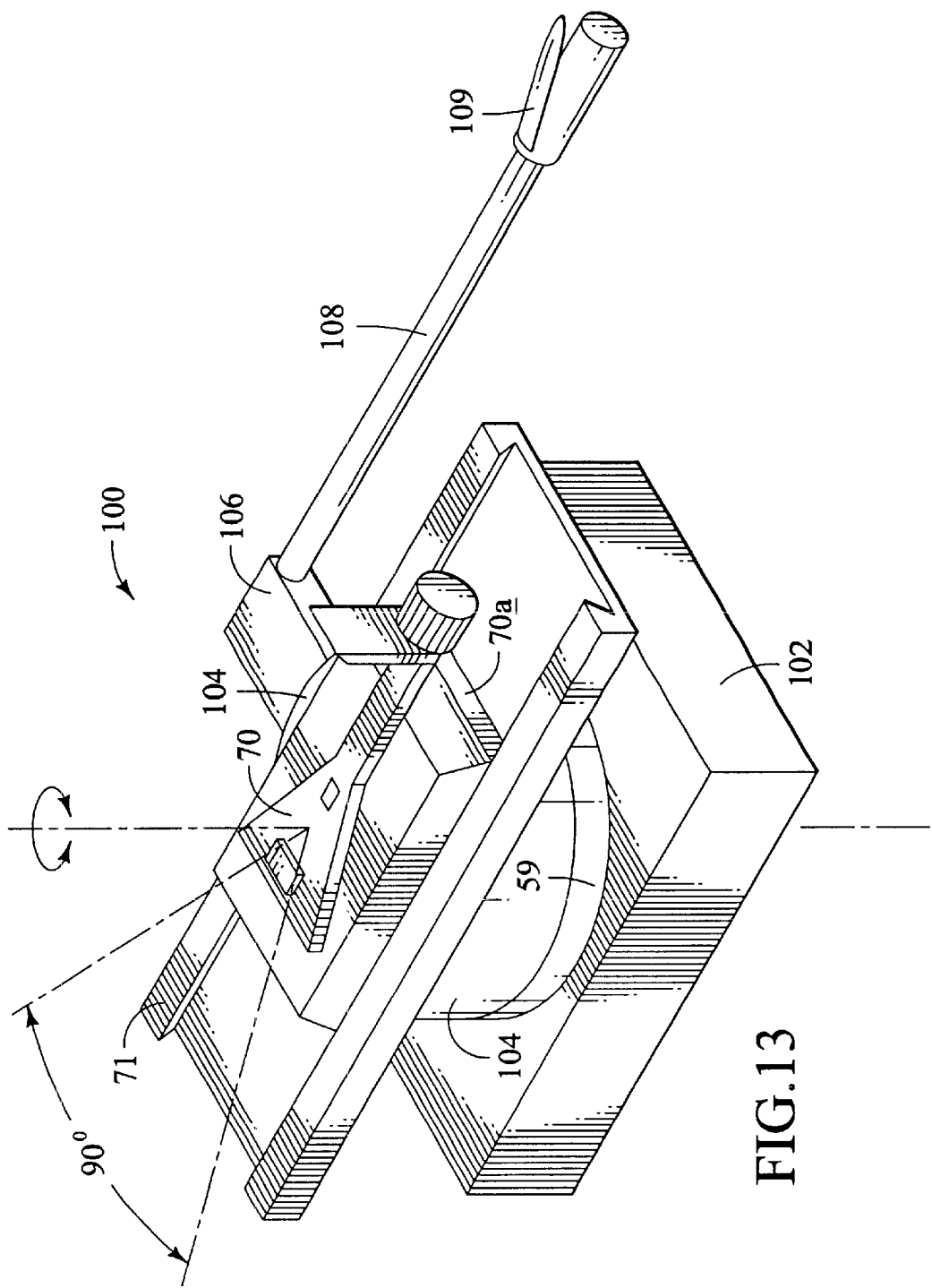
FIG. 13 is a detailed perspective view of a secondary pan mechanism employing a manual actuation configuration.

FIG. 13 illustrates an alternate secondary pan mechanism 100 providing manual actuation. The secondary pan mechanism 100 includes a base plate 102 which would be mounted to the tilt (or roll) plate as in previous embodiments. The camera is mounted to the female dovetail mounting plate 71 via the camera mount 70 (which includes a male dovetail 70a) attached on the bottom of the camera. The camara is mounted to the female dovetail mounting plate 71 via the camera mount 70 (which includes a male dovetail 70a) attached on the bottom of the camera. A ring bearing assembly 104 provides for the rotation of the camera mount 70 and camera relative to the mounting plate 102. The top of the assembly 104 is rotated via a handle 108. The position of the assembly is locked in place by a friction clutch and brake 106 actuated by a brake handle/switch 109. The switch 109 is normally in the closed/locked position preventing rotation. The secondary panning mechanism 100 may only be rotated when the handle switch 109 is actuated, when the switch 109 is released, the brake 106 returns to the locked position.

The ring bearing assembly may alternately comprise any suitable assembly which provides smooth rotation between the camera 5 and the respective mounting plate 52, 84 or 102. The assembly is preferably robust to provide firm support for the weight and torque which are encountered during operation. Tilt heads and remote heads are frequently mounted on a crane or dolly which are moved, such movements providing additional torque onto the assembly.

While embodiments and applications of this invention have been shown and described, it would be apparent to those skilled in the art that other modifications are possible without departing from the inventive concepts herein. The invention, therefore, is not to be restricted except in the spirit of the claims that follow.

What is claimed is:

1. A positioning system for a camera comprising:
   a pan and tilt head having a primary pan mechanism and a tilt plate mounted on the primary pan mechanism;
   a secondary pan mechanism mounted on the tilt plate, the camera being mountable to the secondary pan mechanism, the secondary pan mechanism providing panning of the camera relative to the tilt plate,
   wherein the secondary pan mechanism includes
      a base plate counted to the tilt plate,
      a camera mount onto which the camera may be mounted,
      a ring bearing assembly mounted on the tilt plate for rotatably supporting the camera mount,
      a handle including a locking switch for providing manual actuation of the secondary pan mechanism to pan the camera relative to the tilt mechanism.

2. A system according to claim 1 wherein the pan and tilt head comprises a manually operated cradle tilt head.

3. A system according to claim 1 further comprising
   a camera mounting plate on the secondary pan mechanism;
   a camera detachably mounted to the camera mounting plate.

4. A positioning system for a camera comprising:
   a pan and tilt head having a primary pan mechanism and a tilt mechanism mounted on the primary pan mechanism;
   a secondary pan mechanism mounted on the tilt mechanism, the camera being mountable to the secondary pan mechanism, the secondary pan mechanism providing panning of the camera relative to the tilt mechanism;
   a roll mechanism mounted on the tilt mechanism, the secondary pan mechanism being mounted to the tilt mechanism via the roll mechanism.

5. A system according to claim 4 wherein the pan and tilt head comprises a manually operated cradle tilt head.

6. A positioning system for a camera comprising:
   a pan and tilt head having a primary pan mechanism and a tilt mechanism mounted on the primary pan mechanism;
   a secondary pan mechanism mounted on the tilt mechanism, the camera being mountable to the secondary pan mechanism, the secondary pan mechanism providing panning of the camera relative to the tilt mechanism,
   a motor mounted between the tilt mechanism and the secondary pan mechanism for actuating the secondary pan mechanism to pan the camera relative to the tilt mechanism.

7. A system according to claim 6 further comprising a first sensor for sensing position of the tilt mechanism.

8. A system according to claim 7 further comprising a second sensor for sensing position of the secondary pan mechanism.

9. A positioning system for a camera comprising:
   a pan and tilt head having a primary pan mechanism and a tilt mechanism mounted on the primary pan mechanism;
   a secondary pan mechanism mounted on the tilt mechanism, the camera being mountable to the secondary pan mechanism, the secondary pan mechanism providing panning of the camera relative to the tilt mechanism;
   a first sensor for sensing position of the tilt mechanism;
   a second sensor for sensing position of the secondary pan mechanism;
   a controller in communication with the first sensor and the second sensor for automatically controlling operation of the secondary pan mechanism responsive at least in part upon a signal from the first sensor corresponding to the position of the tilt mechanism.

10. A system according to claim 9 wherein the pan and tilt head comprises a manually operated cradle tilt head.

11. A positioning system for a camera comprising:
    a pan and tilt head having a primary pan mechanism and a tilt mechanism mounted on the primary pan mechanism;
    a secondary pan mechanism mounted on the tilt mechanism, the camera being mountable to the secondary pan mechanism, the secondary pan mechanism providing panning of the camera relative to the tilt mechanism.

12. A positioning system for a camera comprising:
    a pan and tilt head having a primary pan mechanism and a tilt plate mounted on the primary pan mechanism;
    a secondary pan mechanism mounted on the tilt plate, the camera being mountable to the secondary pan mechanism, the secondary pan mechanism providing panning of the camera relative to the tilt plate;
    a roll mechanism mounted on the secondary pan mechanism, the camera be mounted to the secondary pan mechanism via the roll mechanism.

13. A positioning system for a camera comprising:
    a pan, tilt and roll head having a primary pan mechanism, a tilt mechanism mounted on the primary pan mechanism, and a roll plate mounted on the tilt mechanism;
    a secondary pan mechanism mounted on the roll plate, the camera being mountable to the secondary pan mechanism, the secondary pan mechanism providing panning of the camera relative to the roll plate.

14. A system according to claim 13 wherein the pan and tilt head comprises a manually operated cradle tilt head.

15. A positioning system for a camera comprising:
    a pan, roll and tilt head having a primary pan mechanism, a roll mechanism mounted on the primary pan mechanism, and a tilt plate mounted on the roll mechanism;
    a secondary pan mechanism mounted on the tilt plate, the camera being mountable to the secondary pan mechanism, the secondary pan mechanism providing panning of the camera relative to the tilt plate.

16. A positioning system according to claim 15 further comprising a crane for supporting the primary pan mechanism, the primary pan mechanism being mounted to the crane.

17. A system according to claim 15 wherein the pan and tilt head comprises a manually operated cradle tilt head.

18. A method of modifying a pan and tilt mechanism for positioning a camera comprising the steps of
    installing a secondary pan mechanism on a tilt plate of the pan and tilt mechanism, the secondary pan mechanism including a motor mounted between the tilt plate and the secondary pan mechanism for actuating the secondary pan mechanism separately from the pan and tilt mechanism; and
    mounting the camera on the secondary pan mechanism.

* * * * *